(12) United States Patent
Chow (10) Patent No.: US 10,185,581 B2
(45) Date of Patent: Jan. 22, 2019

(54) METHOD AND SYSTEM FOR TAKING CHECKPOINTS AT VARYING INTERVALS

(71) Applicant: VMware, Inc., Palo Alto, CA (US)

(72) Inventor: James E. Chow, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 155 days.

(21) Appl. No.: 15/066,445

(22) Filed: Mar. 10, 2016

(65) Prior Publication Data

US 2017/0262299 A1 Sep. 14, 2017

(51) Int. Cl.
*G06F 9/46* (2006.01)
*G06F 9/455* (2018.01)

(52) U.S. Cl.
CPC .......... *G06F 9/455* (2013.01); *G06F 9/45545* (2013.01); *G06F 9/45558* (2013.01); *G06F 2009/45583* (2013.01)

(58) Field of Classification Search
CPC .. G06F 9/45545; G06F 9/455; C06F 9/45558; C06F 2009/45583
See application file for complete search history.

(56) References Cited

U.S. PATENT DOCUMENTS

| | | | |
|---|---|---|---|
| 8,661,213 B2 | 2/2014 | Scales et al. | |
| 9,703,591 B2 * | 7/2017 | Shimogawa | ........ G06F 9/45558 |
| 2011/0289345 A1 * | 11/2011 | Agesen | ............... G06F 11/2097 714/4.11 |
| 2015/0154081 A1 * | 6/2015 | Javadekar | ........... G06F 11/1484 707/639 |
| 2015/0256462 A1 * | 9/2015 | Tripathi | .................. H04L 47/11 370/236 |

OTHER PUBLICATIONS

James E. Chow, "Lazy Transmission of Memory Pages During Checkpointing" U.S. Appl. No. 14/973,524, filed Dec. 17, 2015, consists of 31 pages.

* cited by examiner

*Primary Examiner* — Camquy Truong
(74) *Attorney, Agent, or Firm* — Patterson + Sheridan LLP (57) ABSTRACT

The method of taking checkpoints of a virtual computing instance running in a first host computer at varying time intervals includes queuing outgoing network data packets of the virtual computing instance during execution of the virtual computing instance, triggering a process to take the checkpoint, the process including generating a checkpoint information packet and transmitting the checkpoint information packet to a second host computer, and upon receiving acknowledgement from the second host computer of receipt of the checkpoint information packet, releasing the outgoing network data packets of the virtual computing instance that have been queued and not released. The triggering time for the process to take the checkpoint is dependent on characteristics of workload executed by the virtual computing instance.

20 Claims, 8 Drawing Sheets

METHOD AND SYSTEM FOR TAKING CHECKPOINTS AT VARYING INTERVALS

BACKGROUND

The advantages of virtual machine (VM) technology have become widely recognized. Among these advantages is the ability to run multiple virtual machines on a single host platform. This makes better use of the capacity of the hardware, while still ensuring that each user enjoys the features of a "complete," isolated computer.

The advantages of various types of checkpointing are also widely recognized, such as providing a backup of some aspect of a computer system and providing the ability to revert back to a previously generated checkpoint to undo changes to some aspect of the computer system or to recover from a failure affecting the computer system. One particular use of checkpointing that is advantageous is to capture the state of a long-running computation, so that, if the computation fails at some point, it can be resumed from the checkpointed state, instead of having to restart the computation from the beginning.

Fast and frequent checkpointing of virtual machines is a useful technology for a number of applications: (1) continuous checkpointing allows users to revert back their application to almost any previous point in time; (2) reverse debugging based on deterministic replay also requires frequent checkpoints to reduce the amount of replay from a previous checkpoint that is required to execute backwards; (3) fast checkpoints can enable the possibility of speeding up an application by allowing speculative calculations that can be reverted if necessary; and (4) fast checkpoints enable fault tolerance.

With respect to (4), checkpoints mirror a primary VM with a secondary VM, such that the secondary VM can resume without loss of data if the host running the primary VM is terminated due to hardware failure. One of the key techniques that ensure no observable data loss from clients is the fact that the primary VM must withhold all network output until it has sent and received acknowledgement for all the data for the checkpoint that follows the network output. If it does not do this, it is possible that upon failover, the secondary VM may not have data that the primary VM had acknowledged to clients, causing an irreparable inconsistency. Such an issue is prevented by withholding the network output of the primary VM until the secondary VM receives all the data for the checkpoint data up to that point.

While withholding the network output of the primary VM ensures correctness, this creates a dependency between the latency of network output for the primary VM, and the size and frequency of checkpoints. On the one hand, it is best to take as frequent checkpoints as possible if the goal is to minimize network output latency. On the other hand, taking checkpoints frequently adds considerable CPU overhead to the VM, stealing away from the VM CPU cycles to be used for checkpointing related tasks instead. Thus, when considering CPU utilization, it is best to take checkpoints as infrequently as possible.

The interplay between these two components of performance on the overall workload performance is subtle. If the checkpoint is taken too often, CPU cycles are wasted unnecessarily, and if not often enough, the network output latency is increased unnecessarily. The solution to this problem is not obvious because in general it is not possible to tell whether a workload would rather trade CPU for network latency or vice versa. There is really no good way to determine what is the right balance for a generic workload.

In addition, the balance resulting from a given checkpoint frequency is highly workload-dependent. Given this difficulty, a common solution to this problem is to create a fixed frequency timer that simply takes checkpoints at regular intervals, with the frequency set to an arbitrary fixed value. Such a solution, however, ignores the trade-offs between minimizing network latency and minimizing CPU overhead, and ignores opportunities for optimization that may be workload-specific.

SUMMARY

Embodiments provide different techniques for taking checkpoints at varying time intervals. According to one embodiment, checkpoints are taken at a time that is set programmatically according to the characteristics of the workload executed by the virtual computing instance. According to another embodiment, checkpoints are taken whenever a new outgoing network data packet of the virtual computing instance is generated.

A method of taking checkpoints of a virtual computing instance running in a first host computer at varying time intervals, according to an embodiment, includes queuing outgoing network data packets of the virtual computing instance during execution of the virtual computing instance, triggering a process to take the checkpoint, the process including the steps of generating a checkpoint information packet and transmitting the checkpoint information packet to a second host computer, and upon receiving acknowledgement from the second host computer of receipt of the checkpoint information packet, releasing the outgoing network data packets of the virtual computing instance that have been queued and not released. In this embodiment, the triggering time for the process to take the checkpoint is dependent on characteristics of workload executed by the virtual computing instance.

Further embodiments include a non-transitory computer-readable storage medium storing instructions that, when executed by a computer system, cause the computer system to perform the method set forth above, and a computer system programmed to carry out the method set forth above.

DETAILED DESCRIPTION

Figure 1:
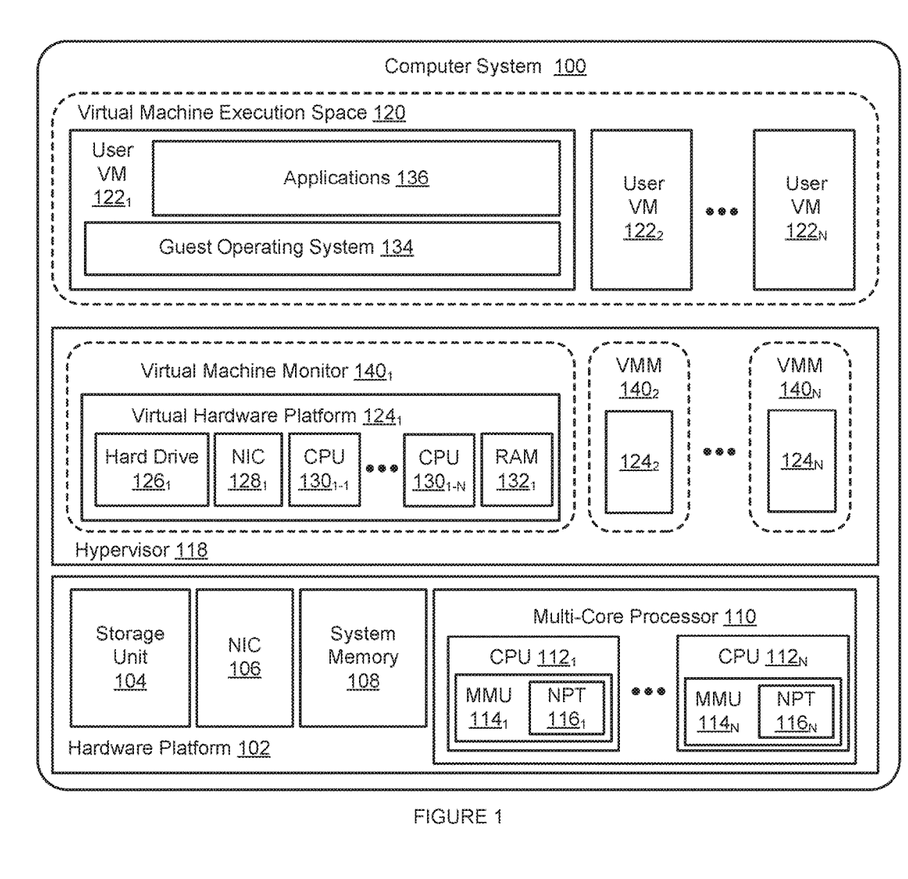
FIG. 1 depicts a block diagram of an SMP-based virtualized computer system.

FIG. 1 depicts a block diagram of an SMP-based virtualized computer system. In one embodiment, both a primary and a backup VM are implemented in separate physical computer systems similar to the SMP-based virtualized system of FIG. 1. Host computer system 100 may be constructed on a desktop, laptop or server grade hardware platform 102 such as an x86 architecture platform. Such a hardware platform may include a local storage unit 104, such as a hard drive, network adapter (NIC 106), system memory 108, symmetric multi-core processor 110 and other I/O devices such as, for example and without limitation, a mouse and keyboard (not shown in FIG. 1). Symmetric multi-core processor 110 provides multiple CPUs $112_1$ to $112_N$ which can operate concurrently and can read and write to any portion of system memory 108. Each of CPUs $112_1$ to $112_N$ includes a memory management unit (MMU) $114_N$ with a support module $116_N$ for traversing nested page tables (NPT) that, as further described below, translate received physical addresses of a VM's guest operating system into the actual corresponding physical addresses of system memory 108 (support module $116_N$ also referred to herein as the "hardware NPT walker"). One example of a multi-core processor 110 that supports such nested page table structures is AMD's Opteron™ family of multi-core processors. It should be recognized that nested page tables are also sometimes referred to as extended page tables.

A virtualization software layer, also referred to hereinafter as hypervisor 118, is installed on top of hardware platform 102. Hypervisor 118 supports virtual machine execution space 120 within which multiple VMs may be concurrently instantiated and executed. As shown, virtual execution space 120 includes VMs $122_1$-$122_N$. For each of VMs $122_1$-$122_N$, hypervisor 118 manages a corresponding virtual hardware platform (i.e., virtual hardware platforms $124_1$-$124_N$) that includes emulated hardware such as virtual hard drive $126_1$, virtual NIC $128_1$, multiple virtual CPUs $130_{1-1}$ to $130_{1-N}$ and RAM $132_2$ for VM $122_1$. For example, virtual hardware platform $124_1$ may function as an equivalent of a standard x86 hardware architecture such that any x86 supported operating system, e.g., Microsoft Windows®, Linux®, Solaris® x86, NetWare, FreeBSD, etc., may be installed as guest operating system 134 to execute any supported application in application layer 136 for user VM $122_1$. Guest operating system 134 of VM $122_1$ includes device drivers (e.g., pre-existing device drivers available for guest operating system 134 etc.) that interact with emulated devices in virtual hardware platform $124_1$ as if such emulated devices were actual physical devices. Hypervisor 118 is responsible for transforming requests from device drivers in guest operating system 134 that are received by emulated devices in virtual platform $124_1$, into corresponding requests to corresponding physical devices in hardware platform 102.

It should be recognized that the various terms, layers and categorizations used to describe the virtualization components in FIG. 1 may be referred to differently without departing from their functionality or the spirit or scope of the invention. For example, virtual hardware platforms $124_1$-$124_N$ may be considered to be part of virtual machine monitors (VMM) $140_1$-$140_N$ which implement the virtual system support needed to coordinate operations between hypervisor 118 and their respective VMs. Alternatively, virtual hardware platforms $124_1$-$124_N$ may also be considered to be separate from VMMs $140_1$-$140_N$, and VMMs $140_1$-$140_N$ may be considered to be separate from hypervisor 118. One example of hypervisor 118 that may be used is included as a component of VMware's ESX™ product, which is commercially available from VMware, Inc. of Palo Alto, Calif. It should further be recognized that other virtualized computer system architectures may be used consistent with the teachings herein, such as hosted virtual machine systems, where the hypervisor is designed to run on top of a host operating system, or a shared storage array network (SAN) that is shared among various virtualized computer systems (e.g., clusters) in order to store virtual hard drives such as hard drive $126_1$.

In addition, the embodiments described above employ a hardware abstraction layer installed on top of hardware platform 102. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines (VMs 122) are used as an example for the virtual computing instances and hypervisor 118 as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www-.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Figure 2:
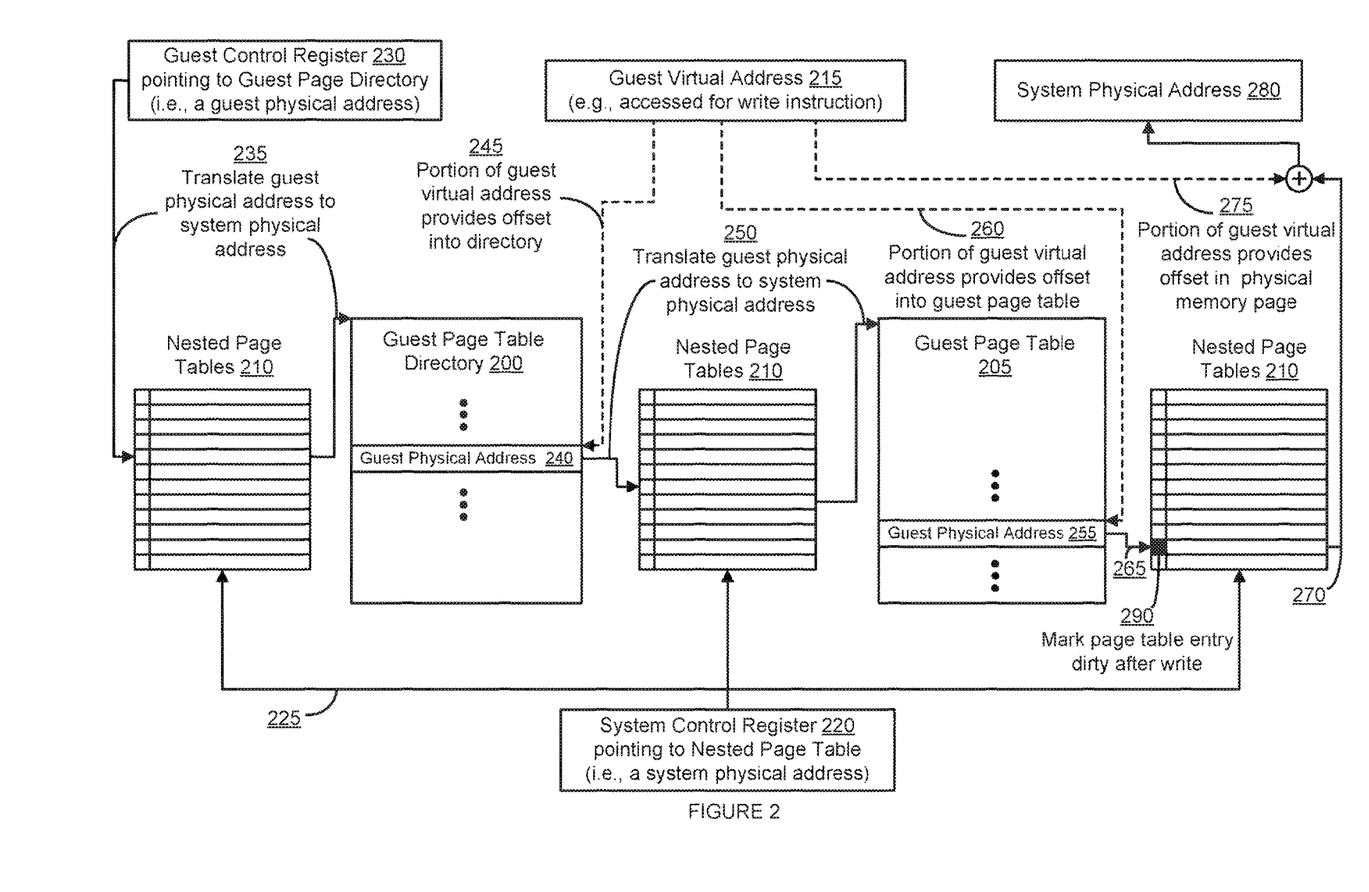
FIG. 2 depicts a logic diagram for memory address translations utilizing a CPU that supports nested page tables.

FIG. 2 depicts a logic diagram for memory address translations utilizing a CPU that supports nested page tables. For example, each of CPUs $112_1$ to $112_N$ of multi-core processor 110 includes an MMU $114_1$-$114_N$, respectively, that implements a hardware NPT walker (e.g., $116_1$-$116_N$). Guest operating system 134 utilizes and maintains a guest page table structure that stores mappings from guest virtual address to guest physical addresses. For example, the embodiment of FIG. 2 depicts a two level page table structure comprising a guest page directory 200 that includes a list of guest physical addresses referencing one of a plurality of guest page tables, such as guest table 205, that each includes a list of guest physical addresses referencing one of a plurality of memory pages. Simultaneously, hypervisor 118 maintains nested page tables 210 that store page table entries of mappings from guest physical addresses to system physical addresses. Although not depicted in FIG. 2, it should be recognized that nested page tables 210 may also be implemented as multi-leveled page tables similar to the guest page table structures. Hypervisor 118 provides hardware NPT walker $116_N$ access to both guest page table structure (i.e., guest page directory 200 and guest table 205) and the nested page tables 210 when performing memory address translations from a guest virtual address to a system physical address.

For example, when guest operating system 134 receives an instruction to write data to guest virtual address 215, guest operating system 134 communicates with virtual RAM $132_1$ in hypervisor 118. Hypervisor 118, in turn, requests hardware NPT walker $116_N$ to access a system control register 220 that stores a system physical address pointing to nested page tables 210 (sometimes referred to as control register CR3) as shown by arrow 225. Hardware NPT walker $116_N$ then accesses a guest control register 230 maintained by VM $122_1$ (e.g., sometimes referred to as guest control register gCR3) that stores a guest physical address pointing to guest page directory 200 and determines the actual system physical address of guest page directory 200 by "walking" nested page tables 210 as shown by arrows 235. Hardware NPT walker $116_N$ then accesses a first bit portion of guest virtual address 215 to determine an offset within guest page directory 200 that corresponds to an entry for guest physical address 240 that references and corresponds to guest page table 205, as shown by arrow 245. Hardware NPT walker $116_N$ walks nested page tables 210 again to determine the actual system physical address of guest page table 205, corresponding to guest physical address 240, as shown by arrows 250. Once the system physical address of guest page table 205 has been determined, hardware NPT walker $116_N$ then accesses a second bit portion of guest virtual address 215 to determine an offset within guest page table 205 that corresponds to a guest physical address 255 that references the page of guest physical memory containing guest virtual address 215, as shown by arrow 260. Hardware NPT walker $116_N$ walks nested page tables 210 again to determine the system physical address corresponding to guest physical address 255, as shown by arrows 265 and 270. Once the system physical address has been determined, hardware NPT walker $116_N$ then accesses a third bit portion of guest virtual address 215 to determine an offset, as shown by arrow 275, within the page of system physical memory pointed to by the determined system physical address in order to finally access system physical address 280 corresponding to guest physical address 215. Once the relevant data has been written to system physical address 280 in accordance with the write instruction, the page table entry of nested page table 210 is marked "dirty" (e.g., setting "dirty" bit) indicating that the page has been written to, as shown by marked entry 290.

Figure 3:
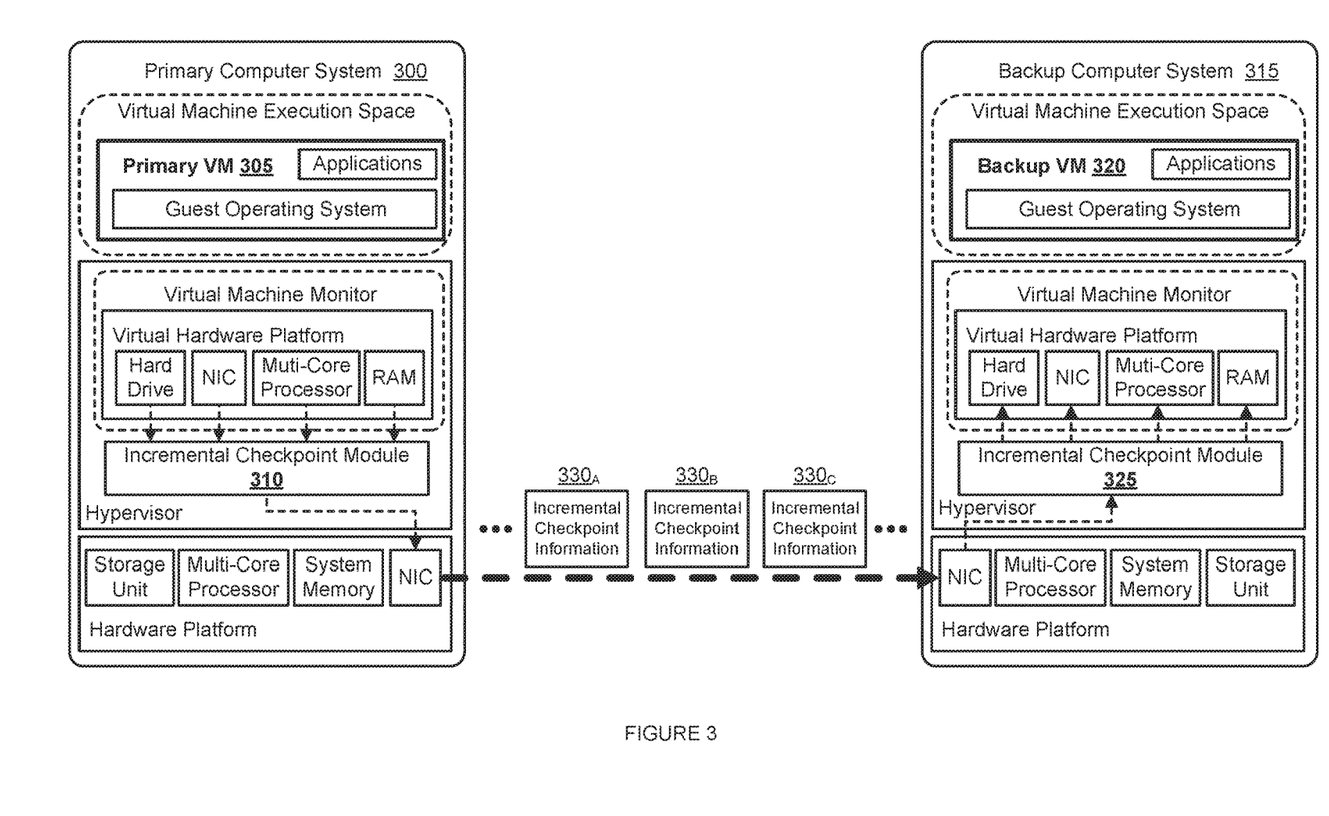
FIG. 3 depicts a block diagram of a primary VM and backup VM engaged in incremental and continuous checkpointing.

FIG. 3 depicts a block diagram of a primary VM and backup VM engaged in incremental and continuous checkpointing. A primary computer system 300 hosts primary VM 305 and includes an incremental checkpointing module 310 in its hypervisor. Incremental checkpointing module 310 continually and frequently transmits incremental checkpoint information packets (see, e.g., $330_A$ to $330_C$) over a network to a backup computer system 315 that hosts backup VM 320. Each checkpoint information packet includes information reflecting changes in the state of primary VM's 305 memory and emulated devices from the prior transmitted incremental checkpoint information packet. On backup computer system 315, incremental checkpointing module 325 of the hypervisor ultimately receives each of the transmitted checkpoint information packets and accordingly updates the state of the memory and emulated devices of backup VM 320 based on the checkpoint information packets. In one embodiment, initiation of the transmission of checkpoint information packets by incremental checkpointing module 310 occurs frequently, for example, once every 10 milliseconds.

Figure 4:
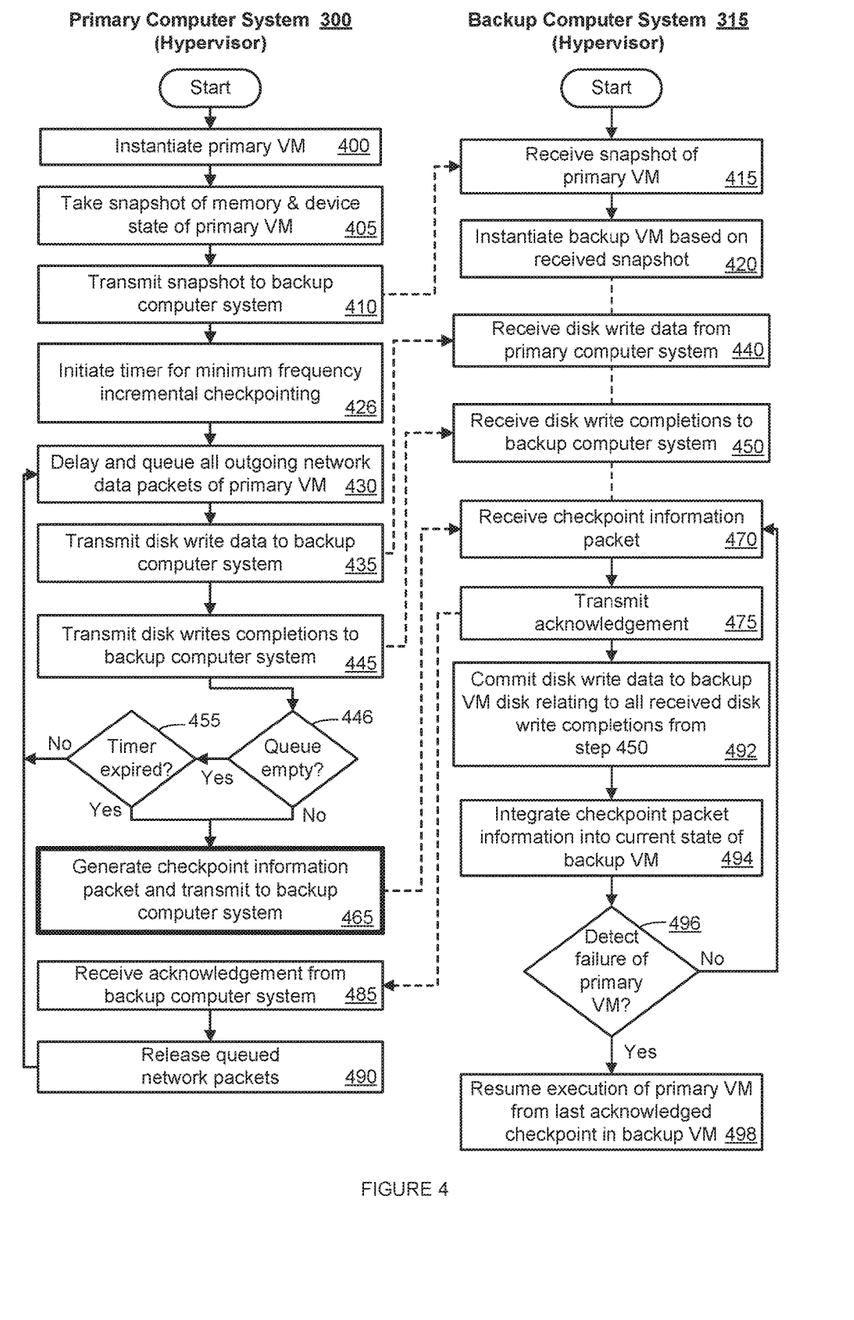
FIG. 4 depicts a flow diagram for transmitting incremental and continuous checkpoint information packets from a primary VM to a backup VM, according to a first embodiment.

FIG. 4 depicts a flow diagram for transmitting incremental and continuous checkpoint information packets from a primary VM to a backup VM, according to a first embodiment. In the first embodiment, incremental checkpointing is triggered when primary VM 305 generates an outbound network packet. Incremental checkpointing is also triggered when it has not been triggered for a set period of time (e.g., 300 milliseconds). Thus, it should be recognized that the checkpoint interval varies in accordance with how often primary VM 305 generates an output network packet, which is influenced by the workload characteristics of primary VM 305.

In step 400, the hypervisor of primary computer system 300 instantiates primary VM 305. In step 405, the hypervisor of primary computer system 300 takes an initial snapshot of the state of primary VM 305 (e.g., state of memory and all emulated devices, etc.) and transmits the snapshot to backup computer system 315 in step 410. For example, in an embodiment utilizing VMware's ESX™ virtualization platform, VMware's VMotion technology can be used to create and transmit this initial snapshot. In step 415, backup computer system 315 receives the snapshot and its hypervisor instantiates backup VM 320 based upon the snapshot in step 420. In step 426, the hypervisor (e.g., its incremental checkpoint module 310) of primary VM 300 initiates a timer for minimum frequency incremental checkpointing (e.g., once every 300 milliseconds). In other words, if this timer (which is reset each time incremental checkpointing is carried out) expires, incremental checkpointing will be carried out at that time to ensure that incremental checkpointing is carried out at least once per the timer setting (e.g., 300 milliseconds).

Steps 430, 435, 445, and the decision blocks 446, 455 are executed prior to incremental checkpointing, which is triggered at step 465. In step 430, the hypervisor delays and queues any and all outbound network packets generated by primary VM 305. In step 435, the hypervisor transmits any data for disk writes made by primary VM 305 during its execution to backup computer system 315, which receives the data in step 440. Similarly, in step 445, the hypervisor transmits all corresponding disk write completion messages to backup computer system 315, which receives the completion in step 450.

In step 446, the hypervisor checks to see if the queue of outbound network packets generated by primary VM 305 is empty. If it is not empty, then the condition for triggering the incremental checkpointing is deemed to be satisfied, and step 465 is executed. If the queue is empty, the hypervisor in step 455 checks to see if the timer for minimum frequency incremental checkpointing has expired. If it has not, the flow returns to step 430. On the other hand, if the timer for minimum frequency incremental checkpointing has expired, incremental checkpointing is triggered and step 465 is executed. In step 465, the hypervisor generates a checkpoint information packet and transmits the checkpoint information packet to backup computer system 315. Details of step 465 are shown in FIG. 5.

Figure 5:
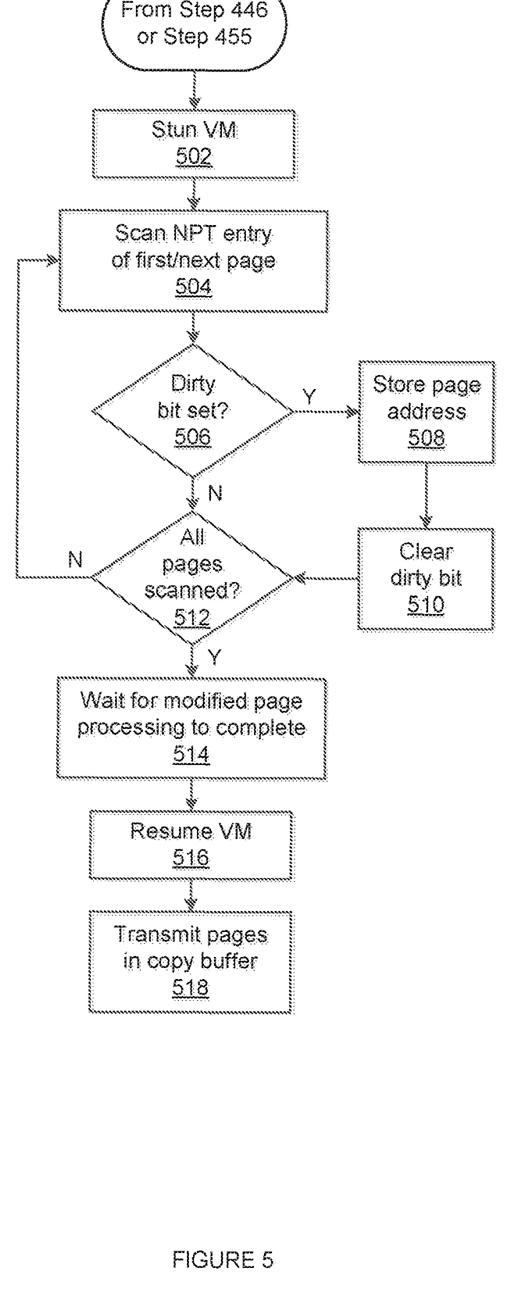
FIG. 5 depicts a flow diagram for "lazy" transmission of memory pages of a primary VM after un-stunning the primary VM.

The hypervisor of primary computer system 300 begins the process shown in FIG. 5 by stunning primary VM 305 (i.e., freezes its execution state) in step 502. Then, the hypervisor, in particular incremental checkpointing module 325, executes steps 504, 506, 508, 510, and 512 to identify memory pages in the virtual memory space of a primary VM that have been modified since the last checkpoint. To identify modified memory pages, one embodiment leverages the setting of dirty bits in nested page table entries by hardware NPT walker $116_N$ when writing to a system physical page as described in FIG. 2. Assuming that nested page table entries are cleared of all set dirty bits during the start of a new time interval, incremental checkpoint module 310 scans the page table entries in nested page tables 210 in step 504. If, in step 506, incremental checkpoint module 310 encounters a page table entry with a set dirty bit, then in step 508, incremental checkpoint module 310 stores in an address buffer the guest physical address and system physical address corresponding to the page table entry with the set dirty bit. The address buffer is consumed by a separate thread which carries out a method depicted in FIG. 6A or 6B to copy modified memory pages for lazy transmission to backup computer system 315.

Figure 6A:
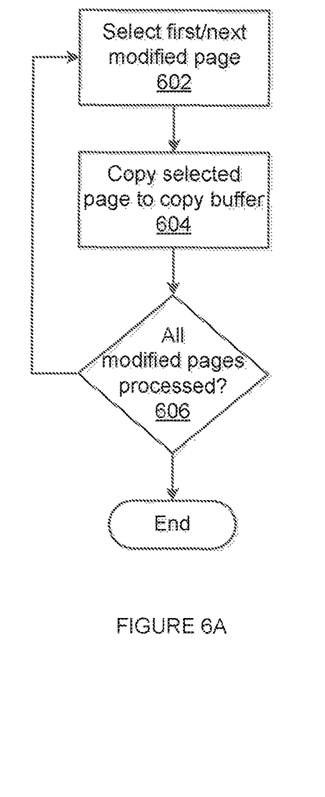
FIG. 6A depicts a flow diagram for copying all modified pages to a copy buffer for lazy transmission.
Figure 6B:
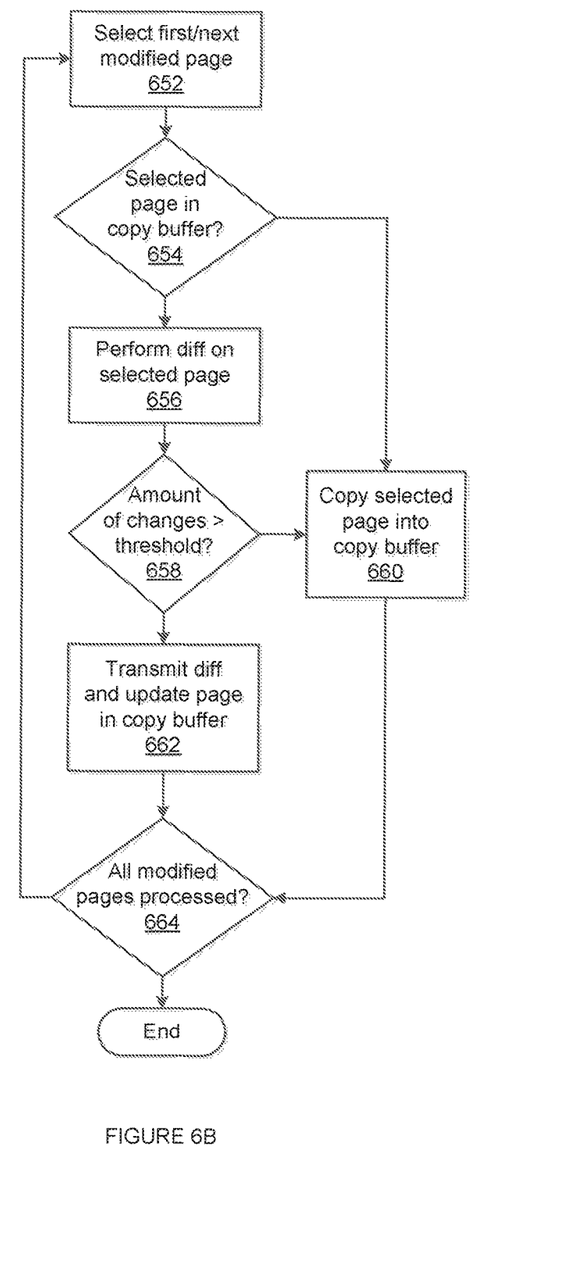
FIG. 6B depicts a flow diagram for generating diffs of some pages for normal transmission while copying the remaining pages in a copy buffer for lazy transmission.

FIGS. 6A and 6B depict alternative methods. In the method of FIG. 6A, modified memory pages are indiscriminately copied to a copy buffer for lazy transmission. In step 602, incremental checkpoint module 310 accesses the address buffer to select the first modified memory page (or the next modified memory page when the process returns to step 602). Then, in step 604, incremental checkpoint module 310 copies the selected page to a copy buffer that is allocated in the system memory of primary computer system 300. According to embodiments, the copy buffer is allocated for each VM that is being checkpointed and sized to hold copies of modified memory pages that have been identified as candidates for lazy transmission. It should be recognized that, if the allocated size of the copy buffer is too small to accommodate copies of all the candidate modified memory pages, incremental checkpoint module 310 performs normal transmission, instead of lazy transmission, for the modified memory pages that cannot be accommodated. Incremental checkpoint module in step 606 checks to see if all addresses in the address buffer have been processed. If so, the process ends. If not, the process returns to step 602.

In the method of FIG. 6B, a diff operation is performed on modified memory pages, such that the memory pages that are copied to the copy buffer for lazy transmission do not include any of the modified memory pages that have been modified by less than a threshold amount. In step 652, incremental checkpoint module 310 accesses the address buffer to select the first modified memory page (or the next modified memory page when the process returns to step 652). Then, in step 654, incremental checkpoint module 310 examines if the selected page has a prior version stored in the copy buffer (or in some embodiments, a separate buffer allocated to store copies of unmodified memory pages so that a diff operation can be carried out on such memory pages after modification). If the selected page does not have a prior version stored in the copy buffer, a diff operation is not possible and so incremental checkpoint module 310 stores the selected page in the copy buffer in step 660 (both for lazy transmission and for diff operation to be carried out thereon during the next checkpoint time interval). On the other hand, if the selected page is in the copy buffer, incremental checkpoint module 310 performs a diff operation in step 656 to determine how much the selected page has been modified by comparing the selected page with the prior version stored in the copy buffer (e.g., byte-by-byte comparison). If the amount of modifications of the selected page is greater than a threshold amount (e.g., 10%) as determined in step 658, incremental checkpoint module 310 stores the selected page in the copy buffer in step 660. On the other hand, if the amount of modifications of the selected page is less than or equal to the threshold amount, incremental checkpoint module 310 transmits the differences to backup computer system 315 (instead of sending the entire page) in step 682. In addition, incremental checkpoint module 310 updates the version of the selected page stored in the copy buffer with the modified version so that a diff operation can be performed against the current version during the next checkpoint interval. Incremental checkpoint module in step 664 checks to see if all addresses in the address buffer have been processed. If so, the process ends. If not, the process returns to step 652.

Returning to FIG. 5, in step 510, incremental checkpoint module 310 clears the set dirty bit for the nested page table entry in preparation for the next checkpoint time interval. In step 512, if scanning of the nested page table entries has not been completed, the flow returns to step 504. As described in the context of FIG. 2, because the dirty bits of nested page table entries are set by hardware NPT walker $116_N$ when a write operation is performed in a memory page, the foregoing steps enable incremental checkpoint module 310 to efficiently identify memory pages that have been modified during the current checkpoint time interval.

It should be recognized that in certain embodiments, nested page tables are hierarchical, with multiple levels of page tables and page directories having entries pointing to different page tables (similar to guest page directory 200 and guest page table 205 in FIG. 2). In one such embodiment, hardware NPT walker $116_N$ also marks a page directory entry with a dirty bit if any memory page in the page directory entry's corresponding page table has been written. An alternative embodiment may mark page directory entries with an "access" bit if any memory page in a page directory entry's corresponding page table has been accessed (e.g., read or written). In either of such embodiments, incremental checkpoint module 310 can utilize hierarchical scanning of the nested page tables to further increase efficiencies, by only descending to the next level if a page directory entry has been marked with a dirty bit or an access bit. This optimization of hierarchical scanning using "access" or "dirty" bits in the page directories is particularly useful for very large memory VMs, since a large part of the memory of a VM may not be accessed or modified in each interval. In yet another alternative embodiment, the scanning of page table entries can be further optimized by subdividing the scanning task to be executed by multiple parallel executing threads. For example, subdivided scanning tasks can be assigned to parallel executing threads in a static round-robin fashion at the lowest page table level. The static assignment ensures that there is little overhead for assigning the tasks to threads, and the low-level interleaved assignment leads to a good load balance where each thread scans both "hot" and "cold" parts of the memory. In yet another embodiment, scanning can be done "eagerly" by an independent thread while the VM is still running (i.e., before a checkpoint starts). Such eager scanning by the independent thread identifies memory pages that have been modified while simultaneously permitting a main executing thread to begin other useful computations on already-identified memory pages, such as "diff" computations on such identified memory pages (as further discussed below).

In step 514, the hypervisor of primary computer system 300 waits for the method depicted in FIG. 6A or 6B to complete. After the method depicted in FIG. 6A or 6B completes, the hypervisor resumes execution of primary VM 305 in step 516 and then, while primary VM 305 is executing, transmits the modified memory pages in the copy buffer to backup computer system 315 in step 518.

Returning to FIG. 4, after the checkpoint information packet (including all of the modified memory pages) have been transmitted to, and received at, backup computer system 315 (step 470), backup computer system 315 transmits an acknowledgement to primary computer system 300 in step 475. Upon receiving the acknowledgement from backup computer system 315 in step 485, primary computer system 300 releases all the queued up network packets (from step 430) in step 490 before returning to step 430.

Once the hypervisor (e.g., its incremental checkpoint module 325) of backup computer system 315 transmits the acknowledgement in step 475, in step 492, the hypervisor commits to the disk of backup VM 320 all disk write data received in step 440 for which the hypervisor also received a disk write completion signal in step 450. In step 494, the hypervisor of backup computer system 315 then merges or otherwise integrates the updated state reflected in the received checkpoint information packet (from step 470) into the current state of backup VM 320. Subsequently, in step 496, if backup computer system 315 detects that primary computer system 300 has failed, then in step 498, backup computer system 315 resumes execution of primary VM 305 as backup VM 320 from the last received (and acknowledged) checkpoint information packet. It should be recognized that delaying and queuing the outbound network packets in step 430 and releasing them only after an acknowledged checkpoint transaction in step 490 ensures that restoration of primary VM 305 by backup computer system 315 upon a failure of primary computer system 300 is based on a state of primary VM 305 that can properly resume network communications with external entities (i.e., re-transmit outbound network packets since the recovered state without confusing recipients, re-receive inbound network packets that it is expecting, etc.).

In the first embodiment described above, incremental checkpointing is carried out "lazily" in that modified memory pages are permitted to be transmitted to backup computer system 315 even after primary VM 305 is resumed. The first embodiment, however, is applicable to other types of incremental checkpointing, including the different types described in U.S. Pat. No. 8,661,213, the entire contents of which are incorporate by reference herein.

Figure 7:
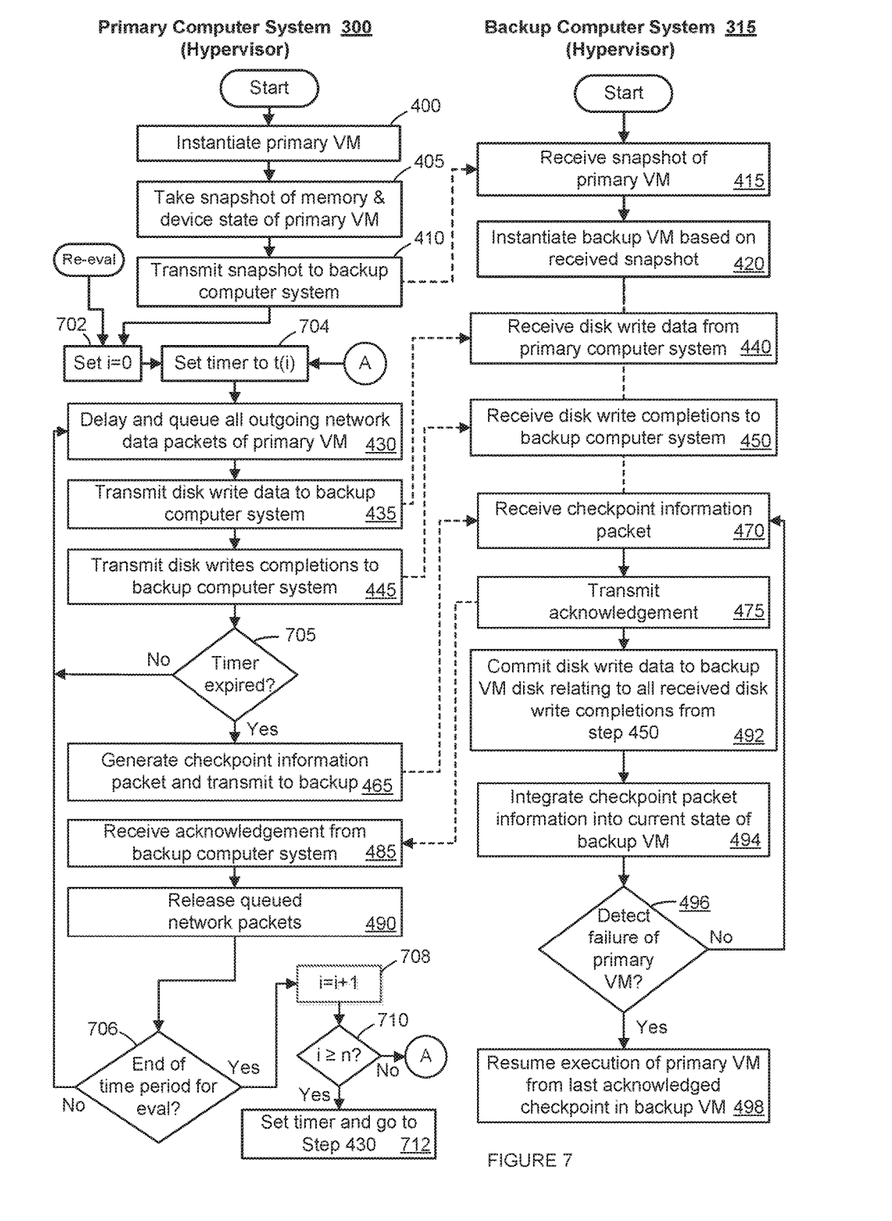
FIG. 7 depicts a flow diagram for transmitting incremental and continuous checkpoint information packets from a primary VM to a backup VM, according to a second embodiment.

FIG. 7 depicts a flow diagram for transmitting incremental and continuous checkpoint information packets from a primary VM to a backup VM, according to a second embodiment. In the second embodiment, incremental checkpointing is triggered at one of several different fixed time intervals that is set programmatically according to characteristics of the workload executed by the primary VM. One or more performance metrics of the primary VM may be used to evaluate the characteristics of the workload executed by the primary VM, and the fixed time interval that result in the best performance during the evaluation period is selected as the fixed time interval to be used. The performance metrics include outgoing network bandwidth of the primary VM, processor utilization, or a combination of the two. They may also include memory utilization and other performance metrics that the VM administrator might consider as a target of optimization for the primary VM. Because the characteristics of the workload executed by the primary VM are expected to change over time, the evaluation is repeated periodically and the fixed time interval may be changed programmatically according to the evaluation.

The flow diagram illustrated in FIG. 7 differs only in some aspects when compared to the flow diagram illustrated in FIG. 4. The steps that are not different are labeled with the same step numbers and their description will not be repeated. In particular, steps 400, 405, 410, 430, 435, 445, 465, 485, and 490 are the same on the side of primary computer system 300 and all of the steps on the side of backup computer system 315 are the same.

On the side of primary computer system 300, after step 410, the hypervisor (e.g., its incremental checkpoint module 310) of the primary VM begins the evaluation of the characteristics of the workload executed by the primary VM by first setting the index, i, equal to 0 (step 702) and setting a timer to the fixed time interval, t(i) in step 704, where i is a value that is incremented from 0 to n−1 (as will be described below), and n represents the number of different fixed time intervals for which the primary VM's workload characteristics will be evaluated. The number n is 2 or more, and in the example given below, n is 4, with t(0)=5 milliseconds, t(1)=10 milliseconds, t(2)=20 milliseconds, and t(3)=100 milliseconds.

Steps 430, 435, and 445 are carried out just as in the first embodiment. Then, in step 705, the hypervisor checks the timer to see if it has expired. If the timer has not expired, the flow returns to step 430. If the timer has expired, it is reset and then steps 465, 485, and 490 are carried out just as in the first embodiment.

In step 706, the hypervisor checks if the time period for evaluating one fixed time interval has expired. The time period for evaluation is, for example, 1 second. However, it should be understood any time period may be selected so long as it is large enough to evaluate the largest fixed time interval a sufficient number of times to be representative of the primary VM's workload characteristics. However, it should not be too large so that non-optimal performance of the primary VM, which would occur during evaluation of some of the fixed time intervals, is not experienced for an unnecessarily long period of time. If the time period for evaluating one fixed time interval has not expired, the flow returns to step 430, and the incremental checkpointing continues with the fixed time interval set at t(i). If the time period for evaluating one fixed time interval has expired, i is incremented in step 708. In step 710, the hypervisor checks to see if all fixed time intervals have been evaluated. If not, the flow returns to step 704 in which the fixed time interval is set to t(i), i.e., the next fixed time interval to evaluate because i was incremented in step 708.

If the hypervisor determines in step 712 that all fixed time intervals have been evaluated, the hypervisor examines the performance metrics that have been selected for the evaluation (e.g., network output bandwidth, CPU utilization, etc.) and sets the timer to the fixed time interval for which the best performance was observed (step 712). After the timer is set in this manner, the flow returns to step 430 and incremental checkpointing is carried out with (i) the time interval set in step 712 and (ii) step 430 executed after step 490, for a period of time until the fixed time intervals are re-evaluated. Re-evaluation of the fixed time intervals is carried out from time to time because the primary VM's workload characteristics are expected to change over time. In one embodiment, the re-evaluation is set for once every 8 seconds, but may be more or less frequent depending on when and how frequently the primary VM's workload is likely to change. When re-evaluation is triggered, the flow illustrated in FIG. 7 jumps to step 702 after step 490 is completed.

Figure 8A:
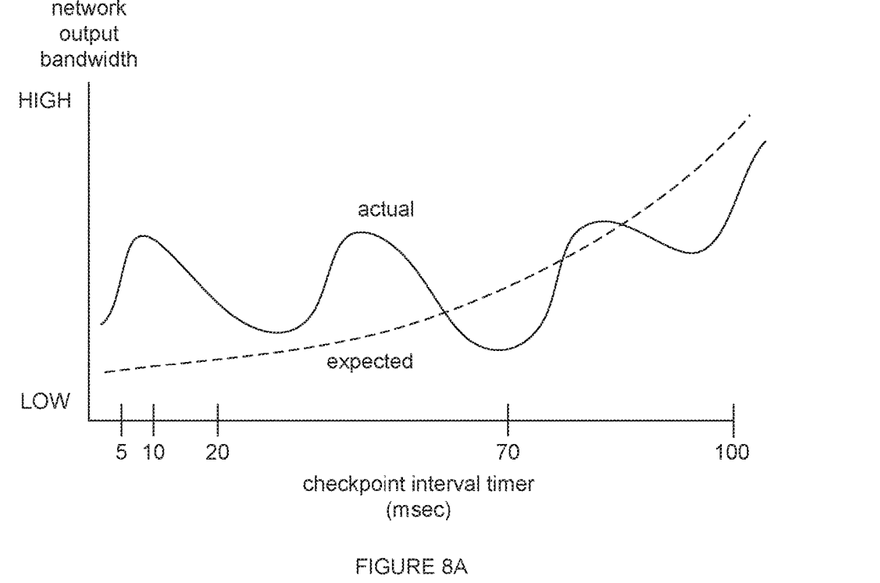
FIGS. 8A and 8B are graphs that illustrate fluctuations in VM performance metrics in response to changes in checkpoint time intervals.

FIG. 8A depicts an example where network output bandwidth is selected as the VM performance metric to observe. The dashed curve represents the expected performance, showing that the network output bandwidth increases with increases in the checkpoint time interval (i.e., decrease in the checkpoint frequency). However, the actual performance does not always follow the expected performance. In fact, the actual performance differs quite a bit and is not predictable because of the complexity of the workloads that a VM may be executing. In FIG. 8A, for illustration purposes, the solid curve is drawn to represent the actual performance. In the example where 5, 10, 20, and 100 milliseconds are selected as the fixed checkpoint time intervals for evaluation, the network output bandwidth observed during the 20 millisecond interval would be the lowest, and thus 20 milliseconds would be selected as the fixed checkpoint time interval. It should be recognized, however, that if a 70 millisecond interval was included in the set of fixed checkpoint time intervals for evaluation, 70 milliseconds would be selected as the fixed checkpoint time interval.

Figure 8B:
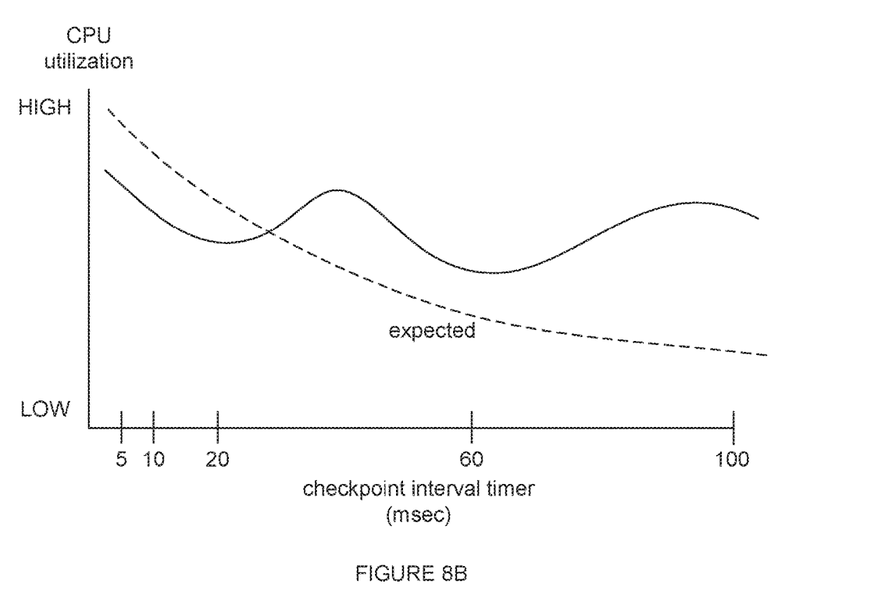

FIG. 8B depicts an example where CPU utilization is selected as the VM performance metric to observe. The dashed curve represents the expected performance, showing that the CPU utilization decreases with increases in the checkpoint time interval (i.e., decrease in the checkpoint frequency). However, as with the network output bandwidth, the actual performance does not always follow the expected performance. In fact, the actual performance differs quite a bit and is not predictable because of the complexity of the workloads that a VM may be executing. In FIG. 8B, for illustration purposes, the solid curve is drawn to represent the actual performance. In the example where 5, 10, 20, and 100 milliseconds are selected as the fixed checkpoint time intervals for evaluation, the CPU utilization observed during the 20 millisecond interval would be the lowest, and thus 20 milliseconds would be selected as the fixed checkpoint time interval. It should be recognized, however, that if a 60 millisecond interval was included in the set of fixed checkpoint time intervals for evaluation, 60 milliseconds would be selected as the fixed checkpoint time interval.

In the second embodiment described above, incremental checkpointing is carried out "lazily" in that modified memory pages are permitted to be transmitted to backup computer system 315 even after primary VM 305 is resumed. The second embodiment, however, is applicable to other types of incremental checkpointing, including the different types described in U.S. Pat. No. 8,661,213.

It should be recognized that various modifications and changes may be made to the specific embodiments described herein without departing from the broader spirit and scope of the invention as set forth in the appended claims. For example, while the foregoing discussions have focused on incremental and continuous checkpointing for fault tolerance, it should be recognized that such techniques may also be used to enable users to revert back in an application to almost any previous point in time, to perform reverse debugging, and to speed up applications by allowing speculative calculations that can be reverted if necessary. Similarly, while the foregoing embodiments have been generally described using a backup VM, any collector process and any backup computer system may be used consistent with the teachings herein. Use of the term "backup computer system" should not be construed as necessarily providing any other types of "backup" functions, other than the functions supporting continuous checkpointing as described herein. For example, a backup computer system may support collector processes other than backup virtual VMs for fault tolerance purposes such as for use in reverting back to particular points of applications, reverse debugging, and speeding up applications.

In addition, while the foregoing discussions have focused on incremental and continuous checkpointing of virtual machines as an example of a virtual computing instance, such techniques may also be used for checkpointing of OS-less containers, which includes the steps of freezing the container, and checkpointing the address space and state of the entire process tree of the container to a collection of image files. Resuming the container from a checkpoint includes the steps of restoring the process tree from the collection of image files and the address space, and resuming the container from the point at which it was frozen.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. A method of taking checkpoints of a virtual computing instance running in the first host computer at varying time intervals, the method comprising:
    queuing outgoing network data packets of the virtual computing instance during execution of the virtual computing instance;
    triggering a process to take the checkpoint, the process including generating a checkpoint information packet and transmitting the checkpoint information packet to a second host computer; and
    upon receiving acknowledgement from the second host computer of receipt of the checkpoint information packet, releasing the outgoing network data packets of the virtual computing instance that have been queued and not released,
    wherein a triggering time for the process to take the checkpoint is dependent on metrics of workload executed by the virtual computing instance, and further wherein the metrics on which the triggering time for the process depends are evaluated against one of (a) bandwidth of the outgoing network data packets of the virtual computing instance, or (b) processor utilization.

2. The method of claim 1, wherein the triggering time is set programmatically according to the metrics of the workload executed by the virtual computing instance.

3. The method of claim 2, wherein the metrics of the workload executed by the virtual computing instance are evaluated against bandwidth of the outgoing network data packets of the virtual computing instance and processor utilization.

4. The method of claim 3, wherein the metrics of the workload executed by the virtual computing instance are evaluated for a plurality of fixed checkpoint time intervals and the fixed checkpoint time interval that has a best combined performance of the bandwidth and the processor utilization is selected as the time interval to be used for taking checkpoints, the triggering time being set based on the selected time interval.

5. The method of claim 1, wherein the process is triggered when a new outgoing network data packet of the virtual computing instance is queued after outgoing network data packets of the virtual computing instance that are associated with a previous checkpoint have been released.

6. The method of claim 1, wherein the process further includes stunning the virtual computing instance before generating the checkpoint information packet and resuming the virtual computing instance after receiving acknowledgement from the second host computer of receipt of the checkpoint information packet.

7. The method of claim 1, wherein the process further includes stunning the virtual computing instance before receiving acknowledgement from the second host computer of receipt of the checkpoint information packet.

8. The method of claim 7, wherein the process further includes:
    after said stunning, detecting at the first host computer memory pages of the virtual computing instance that have been modified during a current checkpoint time interval; and
    after said resuming, transmitting the modified memory pages to the second host computer while the virtual computing instance is running in the first host computer.

9. The method of claim 7, wherein the second process further includes:
    after said stunning, detecting at the first host computer memory pages of the virtual computing instance that have been modified during a current checkpoint time interval, and copying one or more of the modified memory pages to a memory region in the first host computer; and
    after said resuming, transmitting the copied memory pages from the memory region in the first host computer to the second host computer while the virtual computing instance is running in the first host computer.

10. The method of claim 1, wherein the checkpoints include first and second checkpoints that are consecutive in a time order of checkpoints taken, and third and fourth checkpoints that are consecutive in a time order of checkpoints taken, and a first time period between taking the first and second checkpoints and a second time period between taking the third and fourth checkpoints are different.

11. A non-transitory computer readable medium comprising instructions to be executed in a first host computer to cause the first host computer to carry out a method of taking checkpoints of a virtual computing instance running in the first host computer at varying time intervals, the method comprising:
    queuing outgoing network data packets of the virtual computing instance during execution of the virtual computing instance;
    triggering a process to take the checkpoint, the process including generating a checkpoint information packet and transmitting the checkpoint information packet to a second host computer; and
    upon receiving acknowledgement from the second host computer of receipt of the checkpoint information packet, releasing the outgoing network data packets of the virtual computing instance that have been queued and not released, wherein a triggering time for the process to take the checkpoint is dependent on metrics of workload executed by the virtual computing instance, and further wherein the metrics on which the triggering time for the process depends are evaluated against one of (a) bandwidth of the outgoing network data packets of the virtual computing instance, or (b) processor utilization.

12. The non-transitory computer readable medium of claim 11, wherein the triggering time is set programmatically according to the metrics of the workload executed by the virtual computing instance.

13. The non-transitory computer readable medium of claim 12, wherein the metrics of the workload executed by the virtual computing instance are evaluated against bandwidth of the outgoing network data packets of the virtual computing instance and processor utilization.

14. The non-transitory computer readable medium of claim 13, wherein the metrics of the workload executed by the virtual computing instance are evaluated for a plurality of fixed checkpoint time intervals and the fixed checkpoint time interval that has a best combined performance of the bandwidth and the processor utilization is selected as the time interval to be used for taking checkpoints, the triggering time being set based on the selected time interval.

15. The non-transitory computer readable medium of claim 11, wherein the process is triggered when a new outgoing network data packet of the virtual computing instance is queued after outgoing network data packets of the virtual computing instance that are associated with a previous checkpoint have been released.

16. A computer system configured to take checkpoints of a virtual computing instance running therein at varying time intervals, the computer system comprising:
 a system memory comprising a hypervisor to support execution of the virtual computing instance; and
 a processing unit configured to execute the hypervisor to take checkpoints of the virtual computing instance at varying time intervals by performing the steps of:
 queuing outgoing network data packets of the virtual computing instance during execution of the virtual computing instance;
 triggering a process to take the checkpoint, the process including generating a checkpoint information packet and transmitting the checkpoint information packet to a backup host computer; and
 upon receiving acknowledgement from the backup host computer of receipt of the checkpoint information packet, releasing the outgoing network data packets of the virtual computing instance that have been queued and not released,
 wherein a triggering time for the process to take the checkpoint is dependent on metrics of workload executed by the virtual computing instance, and further wherein the metrics on which the triggering time for the process depends are evaluated against one of (a) bandwidth of the outgoing network data packets of the virtual computing instance, or (b) processor utilization.

17. The computer system of claim 16, wherein the triggering time is set programmatically according to the metrics of the workload executed by the virtual computing instance.

18. The computer system of claim 17, wherein the metrics of the workload executed by the virtual computing instance are evaluated against bandwidth of the outgoing network data packets of the virtual computing instance and processor utilization.

19. The computer system of claim 18, wherein the metrics of the workload executed by the virtual computing instance are evaluated for a plurality of fixed checkpoint time intervals and the fixed checkpoint time interval that has a best combined performance of the bandwidth and the processor utilization is selected as the time interval to be used for taking checkpoints, the triggering time being set based on the selected time interval.

20. The computer system of claim 16, wherein the process is triggered when a new outgoing network data packet of the virtual computing instance is queued after outgoing network data packets of the virtual computing instance that are associated with a previous checkpoint have been released.

* * * * *